United States Patent [19]
Weehunt

[11] Patent Number: 6,126,170
[45] Date of Patent: *Oct. 3, 2000

[54] SEAL CAGE

[75] Inventor: Dennis L. Weehunt, 3843 Ross Inlet, Coos Bay, Oreg. 97420

[73] Assignee: Dennis L. Weehunt, Coos Bay, Oreg.

[ * ] Notice: This patent is subject to a terminal disclaimer.

[21] Appl. No.: 09/009,317

[22] Filed: Jan. 20, 1998

Related U.S. Application Data

[63] Continuation-in-part of application No. 08/605,512, Feb. 26, 1996, Pat. No. 5,718,435.

[51] Int. Cl.[7] ..................................................... F16J 15/26
[52] U.S. Cl. .......................... 277/510; 277/500; 277/603
[58] Field of Search ..................................... 277/300, 500, 277/510, 511, 534, 603, 616, 617, 624, 627, 630, 637, 650

[56] References Cited

U.S. PATENT DOCUMENTS

| | | |
|---|---|---|
| 249,415 | 3/1881 | Nicholls et al. . |
| 1,557,379 | 10/1925 | Sudekum . |
| 1,603,206 | 10/1926 | Hull . |
| 1,914,741 | 6/1933 | Gysling . |
| 2,049,774 | 8/1936 | Hoffman . |
| 2,071,204 | 2/1937 | Hunt . |
| 2,111,200 | 3/1938 | Amourelle . |
| 2,215,034 | 9/1940 | Gorman . |
| 2,244,054 | 6/1941 | Cornell, Jr. . |
| 2,267,183 | 12/1941 | Williams . |
| 2,336,474 | 12/1943 | Fulcher . |
| 2,390,602 | 12/1945 | Maier . |
| 2,422,502 | 6/1947 | Schrader . |
| 2,486,359 | 10/1949 | Mayfield . |
| 2,906,395 | 9/1959 | Greer . |
| 3,015,381 | 1/1962 | Mohwinkel et al. . |
| 3,082,825 | 3/1963 | Hanner, Jr. . |
| 3,160,024 | 12/1964 | Mojonnier . |
| 3,284,087 | 11/1966 | Luck . |
| 3,357,693 | 12/1967 | Perry . |
| 3,398,964 | 8/1968 | Trefil . |
| 3,528,666 | 9/1970 | Prampart . |
| 3,528,667 | 9/1970 | Spaven . |
| 3,680,927 | 8/1972 | Neureuther . |
| 3,825,270 | 7/1974 | Paramonoff et al. . |
| 3,834,715 | 9/1974 | Butler . |
| 4,153,260 | 5/1979 | Joyner ..................................... 277/500 |
| 4,498,681 | 2/1985 | Heinz . |
| 4,531,404 | 7/1985 | Phelps et al. . |
| 4,543,832 | 10/1985 | Van Over . |
| 5,013,053 | 5/1991 | Champlin . |
| 5,168,981 | 12/1992 | Ruff . |
| 5,718,435 | 2/1998 | Weehunt . |

FOREIGN PATENT DOCUMENTS 34133  7/1927  France .

OTHER PUBLICATIONS

Brochure entitled Installation Instructions for the WeeSeal Cage, published on or before Jan. 1, 1997.

Glowacki, J.J., "Mills Use New Sealing Compound to Minimize Water Consumption," *Pulp and Paper*, pp. 97–98 (Nov. 1995).

*Primary Examiner*—Anthony Knight
*Assistant Examiner*—Karlena D. Schwing
*Attorney, Agent, or Firm*—Klarquist Sparkman Campbell Leigh & Whinston, LLP

[57] ABSTRACT

The present invention provides an improved seal cage which is useful, for example, for injectable sealing compound systems. In preferred embodiments the dimensions of the seal cage can be adjusted for use of the seal cage with shafts of different diameters and stuffing boxes of varying depths.

31 Claims, 5 Drawing Sheets

SEAL CAGE

CROSS REFERENCE TO RELATED APPLICATION

This application is a continuation-in-part of U.S. patent application Ser. No. 08/605,512, filed on Feb. 26, 1996, now U.S. Pat. No. 5,718,435, incorporated herein by reference.

FIELD OF THE INVENTION

The present invention relates generally to seals for use with rotary or reciprocating shafts, particularly to seal cages used in such seals.

BACKGROUND OF THE INVENTION

Injected sealing compound systems have been introduced as an alternative to expensive mechanical seals used with rotating shafts or braided compression packing used with rotating or reciprocating shafts, e.g., in pumps, compressors, or other apparatus. Unlike mechanical seals and braided compression packing, injectable sealing compounds are self-lubricating, eliminate leakage, need no cooling water or flush water, and do not damage shaft sleeves. Injectable sealing compound systems therefore can substantially reduce or eliminate flush water consumption and equipment maintenance, resulting in substantial savings. See, e.g., Glowacki, "Mills Use New Sealing Compound to Minimize Water Consumption," *Pulp and Paper*, November, 1995, 97–98.

In an injectable sealing compound system, a stuffing box provided with a fluid injection port surrounds a rotating or reciprocating shaft that extends through the stuffing box bore. A sealing means (e.g., braided packing rings, gasket rings, restriction bushing, taper rings) concentrically surround the shaft at opposite ends of the stuffing box bore. The space between the packing seal rings is filled with an injectable sealing compound that is injected under greater than atmospheric pressure into the stuffing box through an injection port. The packing rings or other sealing means depend on the injectable sealing compound to hold them in place.

Leakage of the injectable sealing compound from the stuffing box can cause the packing seal rings or other sealing means to move toward each other. If one of the packing seal rings blocks or moves past the injection port, it is necessary to shut down the machinery and reposition the rings before resealing. If a packing seal ring opens up at its joint, sealing compound can escape from the stuffing box.

SUMMARY OF THE INVENTION

The present invention provides an apparatus that is useful as a spacing device, e.g., a seal cage or lantern ring for a seal or compression packing associated with a shaft. Embodiments of the invention can be used, for example, in injectable sealing compound systems, for which previous seal cage designs are ill-suited.

According to one embodiment of the invention, the apparatus includes rails that are adapted to be disposed in an annular configuration around a shaft in laterally spaced positions to contain an injectable sealing compound in a space defined between the seal cage and the shaft. Each rail includes brace towers that are spaced apart longitudinally along the rail and connected by connector elements. In some embodiments of the invention, the connector elements are connected to the brace towers nearer to the end of the second projecting portion (projecting away from the shaft) than to the first projecting portion. At least one brace element is attached to the brace towers of the rails and extends between the rails to maintain lateral spacing between the rails.

The brace towers each include a first projecting portion that projects toward the shaft and a second projecting portion that projects away from the shaft. In at least some embodiments, brace towers on one rail are laterally aligned with brace towers on the other rail with brace elements or cross braces extending between the aligned brace towers. Thus, each brace element extends from a respective brace tower of one rail to a corresponding brace tower of the other rail.

There are a plurality of openings between the rails of a sufficient size to permit an injectable sealing compound to flow through the openings and into the space between the seal cage and the shaft. Preferably, the openings occupy from about 50 to 90 percent or more of the area defined between the rails.

According to another embodiment of the invention, a brace element has an elongate element at one or both ends of which is a head portion that is adapted to bear against and project outwardly from one side of a first rail (the side facing away from the second rail), and a shoulder spaced inwardly from the end of the brace element and adapted to bear against the other side of the first rail (the side that faces toward the second rail), thereby restricting lateral movement of the first rail relative to the second rail.

According to another embodiment of the invention, a land is positioned between adjacent brace towers. The land projects away from the shaft when the rails surround the shaft.

According to another embodiments of the invention, the brace element(s) is releasably attached or mounted to the brace towers. For example, in one such embodiment, respective brace towers of the two rails are each provided with a slot sized to receive an end portion of a brace element. The spacing between the rails, and thus the "width" of the apparatus, can therefore be adjusted for use with a wide range of stuffing box depths by selecting brace element(s) of an appropriate length.

According to another embodiment of the invention, the length of the rails, and thus of the seal cage, is adjustable to permit the seal cage to be adapted for use with shafts of different diameters. For example, the rails (or the entire apparatus) can be made of a material that can be cut. Alternatively, short lengths of a rail or assembled seal cage portions can be linked together to form longer rails or seal cages. Various link arrangements are discussed below. For example, in a "split rail" linking arrangement, each end of a rail (or adjoining ends of two rail sections) is provided with a rail end portion or partial brace tower. When a rail end portion of one section of rail is aligned with a complementary rail end portion of another section of rail, the rail end portions of the two sections together define a brace receptacle that releasably holds a brace element (e.g., an end portion thereof), thereby connecting the two rail ends. This "split rail" linking arrangement can be used to connect two ends of a single rail, holding the rail in an annular configuration or joining two rail portions, for example. Alternatively, one or more linking elements can be attached to brace elements of ends of a seal cage (or seal cage portions).

A seal cage according to at least some embodiments of the invention can be assembled from several parts, including, for example, rails and brace elements. Accordingly, seal cages according to such embodiments can be provided as a kit that includes, for example, rails having brace towers of different heights, braces of different lengths, linking elements, etc. Alternatively, one-piece (i.e., monolithic) seal cages are also provided. For example, one-piece embodiments can be injection molded in a closed, annular configuration, or in an open (e.g., flat, linear) configuration such that the apparatus can be curved about a central axis to assume an annular configuration for installation.

According to another embodiment of the invention, the seal cage retains an injectable sealing compound in the space between the seal cage and a shaft without a sealing means exterior to the rails, e.g., packing seal rings, braided compression packing, gasket rings, restriction bushings, taper rings, or other conventional sealing means.

Use of an injectable sealing compound system including a seal cage according to the invention results in lower total material and operation costs and substantially lower water consumption (since flush water can be eliminated) as compared with standard compression packing or mechanical seals.

The foregoing and other features and advantages of the invention will become more apparent from the following detailed description and accompanying drawings.

DETAILED DESCRIPTION OF A PREFERRED EMBODIMENT

While the present invention is susceptible of embodiment in many different forms and would be useful in a wide variety of apparatus, there is shown in the drawings and will herein be described in detail preferred embodiments of the invention. The present disclosure is, however, to be considered an exemplification of the principles of the invention and is not intended to limit the broad aspect of the invention to the embodiment illustrated. Those skilled in the art will appreciate the utility of this invention, which is not limited to the specific embodiments and materials described herein.

Figure 1:
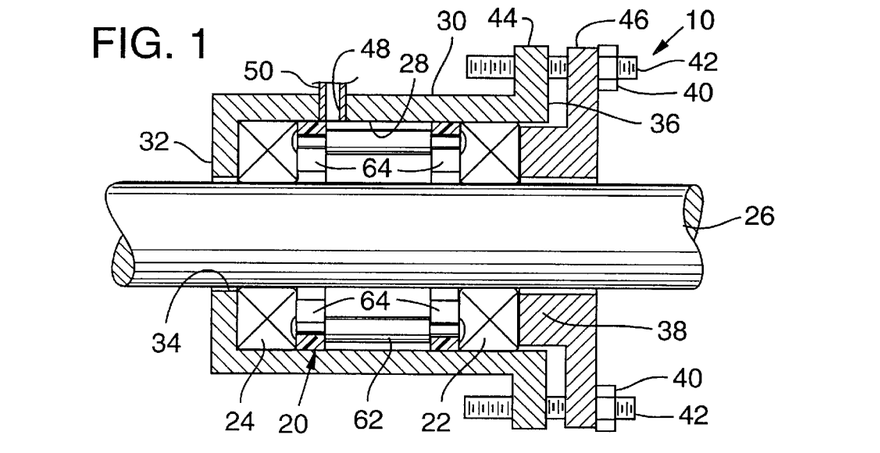
FIG. 1 is a simplified cross-sectional view of an injectable sealing compound system including a seal cage according to one embodiment of the invention.

Apparatus according to the invention can be used as seal cages with a variety of conventional sealing systems associated with rotatable or reciprocatable shafts. FIG. 1 shows one embodiment of an injectable sealing compound system 10 surrounding a rotatable or reciprocating shaft 26. The system 10 includes a seal cage 20 according to the invention positioned between spaced apart top and bottom packing seal rings 22, 24 that concentrically surround the shaft 26 at the opposite ends of the bore 28 of a stuffing box 30. End 32 of the stuffing box has a centrally located shaft opening 34 of a diameter sufficient to permit the shaft 26 to penetrate the stuffing box 30. The opposite end 36 of the stuffing box is closed by a flanged packing follower, or gland, 38 that extends into the stuffing box bore 28 to contact and exert pressure against the contents thereof. The position of the packing follower 38, and thus the pressure it exerts on the contents of the stuffing box, can be adjusted by means of the packing follower nuts 40 that are threaded onto threaded studs 42 that pass through flange 44 on the stuffing box and flange 46 on the packing follower.

Injectable sealing compound is injected under greater than atmospheric pressure into the bore 28 of the stuffing box through a fluid inlet port 48, that extends through the stuffing box 30, via a fluid inlet nipple 50. The seal cage 20 is located under the fluid inlet port 48.

Figure 2:
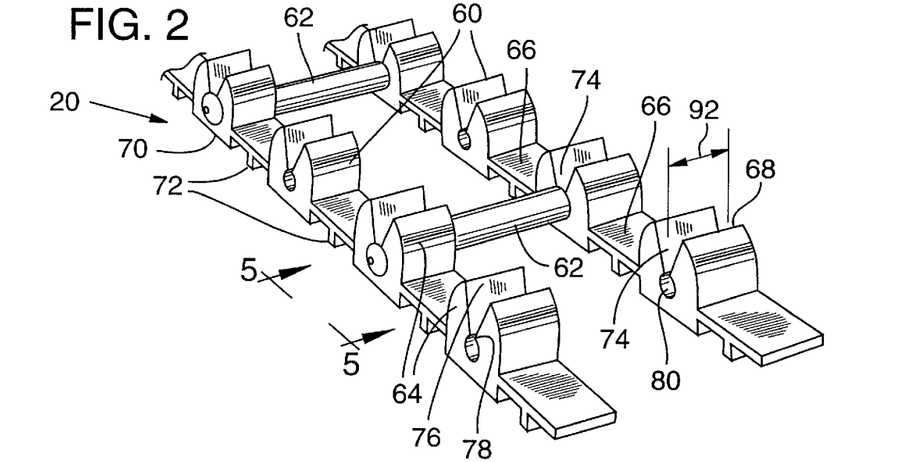
FIG. 2 is a perspective view of an assembled apparatus according to one embodiment of the invention in a linear configuration.

FIG. 2 shows an assembled seal cage 20 prior to installation in an injectable sealing compound system. The seal cage 20 comprises a pair of flexible elongate rails 60 that are laterally spaced apart by braces 62 that extend between the rails 60. Braces 62 are substantially rigid to maintain a fixed spacing between rails 60 during use. The seal cage 20 thus has a ladder-like configuration. The rails 60 include a plurality of brace receptacles, or towers, 64 that are spaced apart at selected intervals longitudinally of the rail. As shown in FIGS. 2 and 3, the brace receptacles 64, are flexibly connected by connector portions 66 of the rails. These are shown as flexible strips or portions that connect to the brace receptacles 64 between the upper and lower ends thereof, noted as 68, 70, respectively. Thus, the brace receptacles 64 include a portion that projects toward the shaft (having upper end 68), and a portion that projects away from the shaft 26 and toward the stuffing box bore 28 (having lower end 70). When the seal cage 20 is installed, while lower end 70 will be adjacent the stuffing box bore 28. The connector 66 preferably is attached to the brace receptacle 64 at a point nearer lower end 70. Reinforcing lands 72, positioned intermediate spaced brace receptacles 64, extend from connectors 66 in the same direction as ends 70 to contact a plane occupied by ends 70 of adjacent brace receptacles when the seal cage is in a flat, linear configuration. The lands 72 are adapted to prevent buckling of connectors 66 in use.

A brace receptacle 64 can be of many different shapes, some of which are shown in FIGS. 2 and 3A–3D. A brace receptacle 64 has a first end 68 and a second end 70. A slot 74 extends inwardly from end 68 of the brace receptacle. The slot 74 has a tapered slot opening or entry way 76, a constricted throat 78, and a cylindrically shaped slot end, or holding region, 80 that receives an end portion of a brace when inserted by snap fitting the brace into the slot. The height of the brace receptacles 82 (i.e., the distance between the ends 68, 70 as seen in FIGS. 3A–3D) corresponds with and should be no greater than a preferred packing seal ring size. For example, ⁵⁄₁₆ inch packing seal rings require a brace receptacle height 82 of slightly less than ⁵⁄₁₆ inch.

Figure 4A:
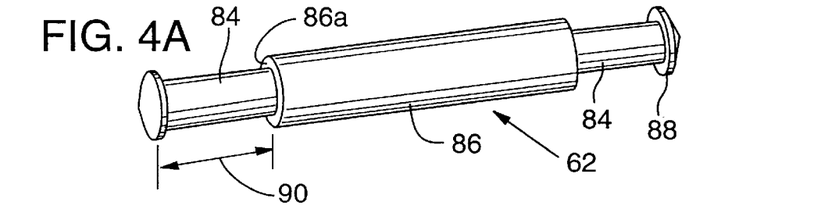
FIGS. 4A and 4B are perspective views of two different embodiments of a brace.

As shown in FIG. 4A, in one embodiment a brace 62 is a generally cylindrical elongate rigid pin machined to have opposed head portions 88 at opposite ends thereof and a central region 86 having shoulders 86*a*, all of substantially equal diameter. Adjacent the head portions 88 are neck portions 84 of a smaller diameter than the head portions 88 and central portions 86. The length 90 of portion 84 is sufficient to receive the width of a brace receptacle 64.

Figure 4B:
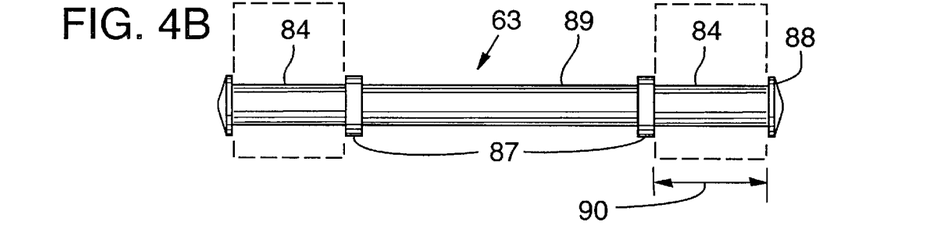

As shown in FIG. 4B, in another embodiment of a pin 63, the central region is replaced by narrow annular shoulders 87 between which is a region 89 having substantially the same diameter as neck portions 84. This pin design can be employed with all pin lengths, and particularly with shorter pin lengths.

When a pin 62 (or pin 63, if desired) is inserted into a brace receptacle 64, the brace receptacle 64 is captured between head portion 88 and shoulder 86*a* (or 87). Head portion 88 projects outside the rail 60 and bears against one side of the brace receptacle 64, and shoulder 86*a* (or 87) bears against the opposite side of the brace receptacle 64, thereby preventing the rails 60 from moving together or apart.

As shown in FIG. 2, the seal cage 20 is designed to permit substantially free and unhindered flow of injectable sealing compound, which may have a putty-like consistency, to completely fill and seal the stuffing box bore 28 in the space between the packing seal rings 22, 24 occupied by the seal cage 20. The dimensions and spacing of the pins 62 is such that the seal cage 20 openings are defined in the area between the laterally spaced rails 60 that are of a sufficient size to permit even highly viscous injectable sealing compounds to flow into and substantially fill the space defined between the rails. Preferably the braces, or pins, 62 occupy a minor portion of the space between the rails and the openings defined between adjacent braces (and between the rails) are sized sufficiently to permit an injectable sealing compound to flow through such openings and into the space between the seal cage and the shaft. The area defined between the rails 60 is preferably about 50 percent or more open and more preferably about 75 percent or more. The open area between the rails can be calculated by dividing the combined cross-sectional area of the braces (i.e., pin diameter×distance between rails×number of pins) by the total area defined between the rails (i.e., rail length×distance between rails). Injectable sealing compound can also flow into the spaces between the connector portions 66 and the ends 68, 70 of the brace receptacles. The use of substantially round pins 62 (rather than braces of square or other shapes) also facilitates free movement of the injectable sealing compound. Since injectable sealing compound tends to flow more easily into the larger open spaces between connector 66 and ends 68 than into the smaller open spaces between connector 66 and end 70, the assembled seal cage 20 tends to be pushed by injectable sealing compound away from the shaft 26 towards the bore 28 as the compound eventually fills all available space.

When the seal cage 20 is assembled and installed between packing seal rings 22, 24, the head portions 88 embed into the packing seal rings 22, 24 and prevent rotation of the seal cage 20. Alternatively, the rails 60 can be provided with extensions to embed into the packing seal ring material or, alternatively, with slots or grooves into which packing seal ring material can extend, to accomplish the same purpose.

The seal cage is designed for use with such injectable sealing compounds as Thermo-P & S® (Hendler's Inc., Markham, Ontario, Canada), TP-4000® (Tom-Pac, Inc., St-Laurent, Canada), and CMS 2000® (A. W. Chesterton Co., Stoneham, Mass.). Mechanical pressure applied to each of the two packing seal rings 22, 24 by the seal cage 20 is approximately the same. This design therefore provides a good seal between the packing seal rings 22, 24, shaft 26, and stuffing box bore 28 to contain injectable sealing compound injected into the system 10 with very little leakage in either direction. In addition, openings between the braces are large enough to permit highly viscous injectable sealing compounds, which may be putty-like in consistency, to completely fill the seal cage and to seal to the shaft and to the walls of the stuffing box.

A rail 60 may be provided as a continuous roll or length of material from which one or more rails of a selected length are cut to an appropriate size for the stuffing box bore 28, i.e., to fit snugly to the stuffing box bore 28 and away from the shaft 26. Alternatively, rails 60 can be pre-formed to an appropriate length, in which case the rails 60 can be provided in a closed, annular form or in an open, linear form as shown. Connecting portions 66 are thin enough to provide sufficient flexibility to permit a rail 60 to curve about a central axis to conform to the shaft 26, yet wide enough to substantially restrict or prevent flexing of the rail 60 in a direction substantially parallel to the brace receptacles. As shown, connecting portions 66 are substantially equal in width to the rail 60.

Rails 60 preferably are made of a molded plastic material that is reasonably flexible, is chemically resistant, is suitable for use over a large temperature range, and does not score the shaft 26 around which the rails 60 are wrapped when shaft contact occurs. A preferred material for the rails 60 is a molded plastic, such as an ultra high molecular weight (UHMW) polypropylene (e.g., Pellethane® 2103-65D, Dow Chemical Co., Midland, Mich.) or other conventional materials, including but not limited to, nylon, glass-filled PTFE, or polyethylene depending upon the required temperature range and chemical resistance. Inflexible materials can also be used for the rails 60 (e.g., a rigid molded plastic or a metal such as stainless steel or brass) as long as the rails are disposable around a shaft. For example, the rails can be in a pre-formed annular configuration or be provided with conventional flexible joints or hinges, e.g., at the point of attachment between connecting portions 66 and brace receptacles 64, to permit the rails to bend about a central axis into a curved configuration.

The pins 62 can be made from the same material as the rails 60 or a stronger and more rigid material, e.g., a molded plastic (e.g., Delrin® 100, Dupont Co., Wilmington, Del.), a metal (e.g., stainless steel or brass), or other conventional material that has the required temperature range and chemical resistance.

Figure 3A:
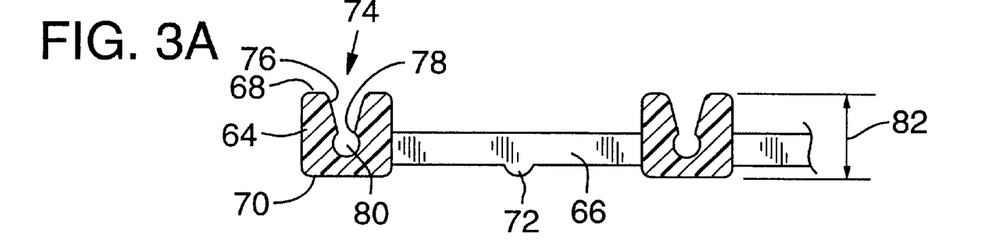
FIGS. 3A–D are cross-sectional views of portions of rails having brace receptacles of different heights.
Figure 3B:
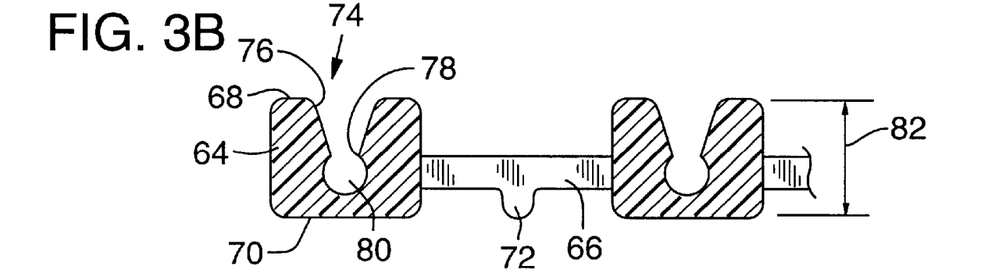
Figure 3C:
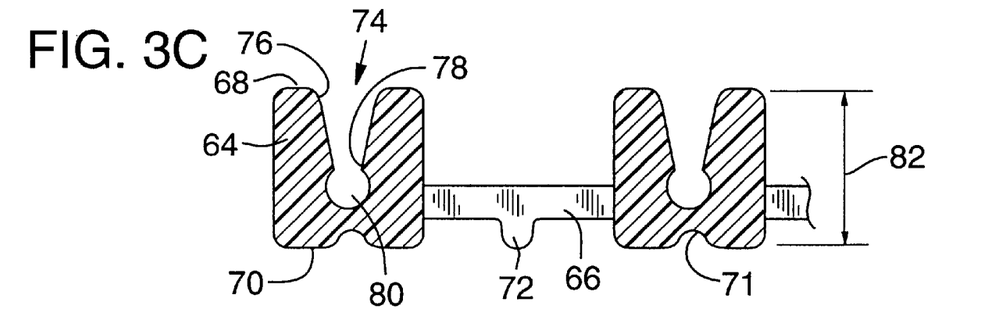
Figure 3D:
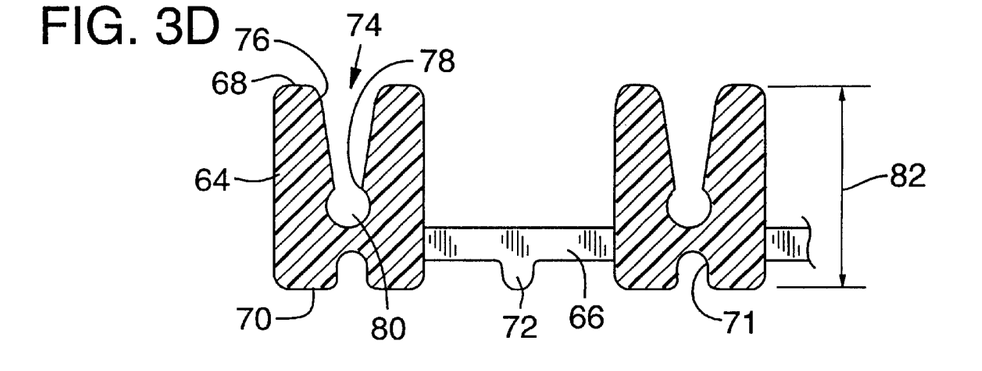
Figure 6:
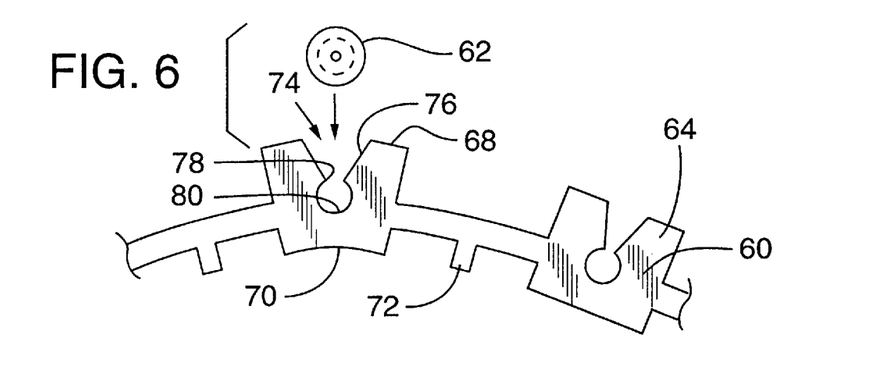
FIG. 6 is a side view showing a rail bent back to permit a pin to be inserted into a slot of a brace receptacle.
Figure 7:
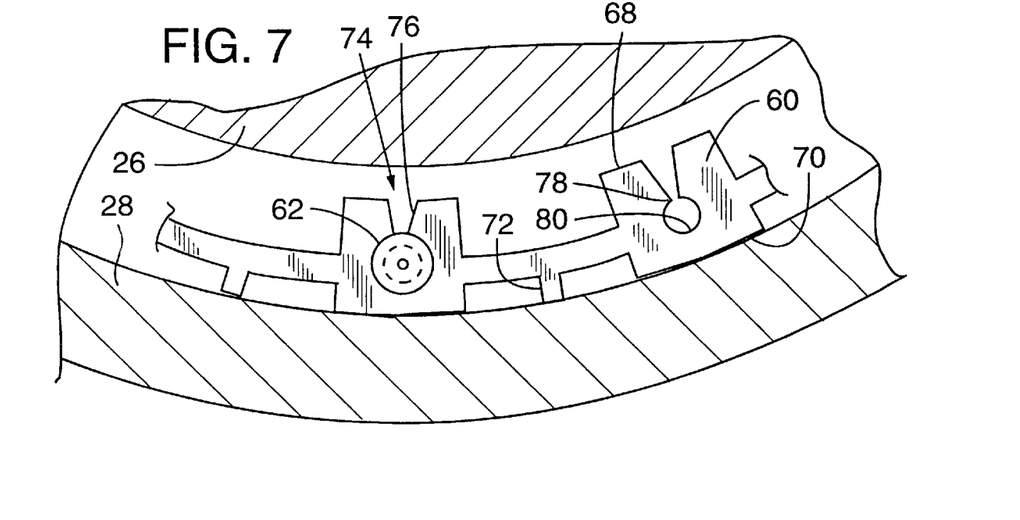
FIG. 7 is a side view showing that when a rail is disposed around a shaft, the slot opening of a brace receptacle partially closes and the pin is firmly held by the brace receptacle.

In order to assemble a seal cage 20 according to the invention, a first rail 60 is bent back as shown in FIG. 6, thereby causing the slot 74 to flex and partially open (i.e., relative to a slot 74 of a rail 60 lying flat as shown in FIG. 2) to permit a pin 62 to be inserted past throat 78 into place in the holding region 80 of a brace receptacle 64. (As shown in FIG. 3D, the bottom end 70 of the brace receptacles, particularly larger brace receptacles, can be provided with a substantially central groove 71, to facilitate flexing of the slot 74.) When the rail 60 is not so flexed, a pin or brace 62 is frictionally held in the slot end 80. As shown in FIG. 7, the seal cage 20 is preferably disposed around a shaft 26 such that the slot 74 is partially closed (relative to a slot 74 of a rail 60 lying flat as shown in FIG. 2) and the pin 62 is held firmly in place in the slot end 80. Pins 62 are installed, preferably in every other brace receptacle 64 or more frequently to provide additional stability. (An additional pin 62 also can be installed in a brace receptacle 64 at the end of a seal cage 20, particularly if there is a significant gap between the opposed ends of a seal cage 20 when it is disposed around a shaft 26.)

A second rail 60 of similar length is aligned with the first, bent in the same way, and the pins 62 are likewise snapped into place in the second rail 60 to complete the assembly of a seal cage. The braces, or pins, are held in laterally aligned receptacles in the laterally spaced apart rails. As can be readily appreciated by persons of ordinary skill in the art, this process can be reversed in order to remove and replace pins in a seal cage according to the present invention.

Figure 5:
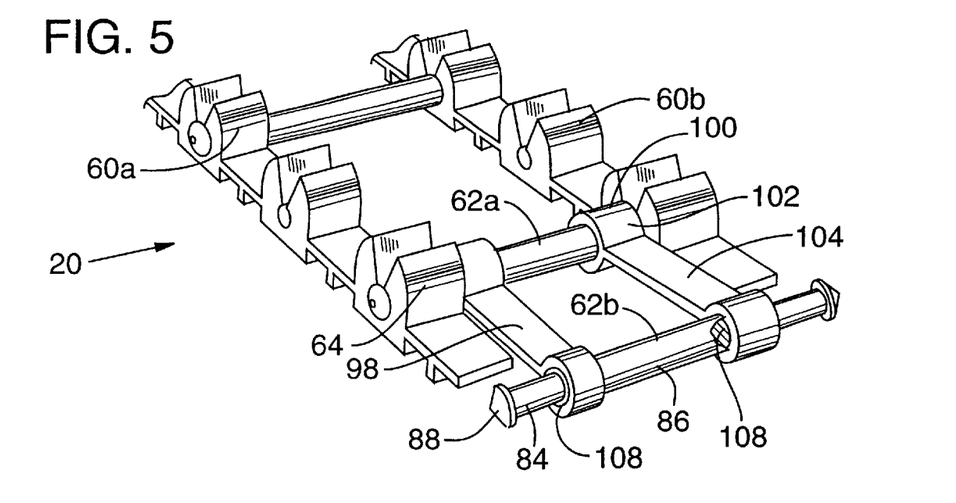
FIG. 5 is a perspective view of a length of seal cage at the end of which is attached one embodiment of a master link.

Two lengths of seal cage 20 can be connected to form a longer seal cage (or ends of a single seal cage section can be connected) by using a master link 98. If desired, the two ends of a seal cage can also be joined by such a master link 98. The master link 98, shown in FIG. 5, has two side-by-side linking elements 100, each linking element 100 comprising two end portions 102 spaced apart by a connecting portion 104. First and second braces, or pins, 62a, 62b pass through central openings 108 in the end portions of the linking elements 102, which have a diameter at least as large as the central portions 86 (or shoulders 87) of the pins. The first pin 62a is inserted into brace receptacles 64 at the end of paired rails 60a, 60b of a first length of seal cage 20, interior to the paired rails 60a, 60b. The second pin 62b is inserted into brace receptacles 64 at an opposed end of paired rails of a second length of a seal cage, again interior to the paired rails thereof.

Figure 8:
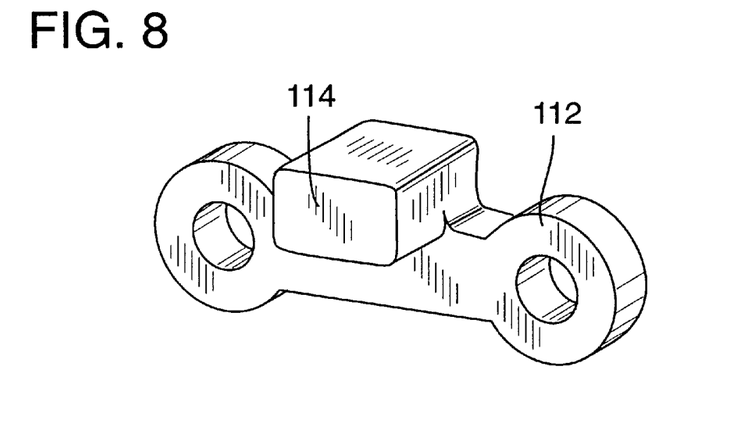
FIG. 8 is a perspective view of an alternative embodiment of a master link.
Figure 9:
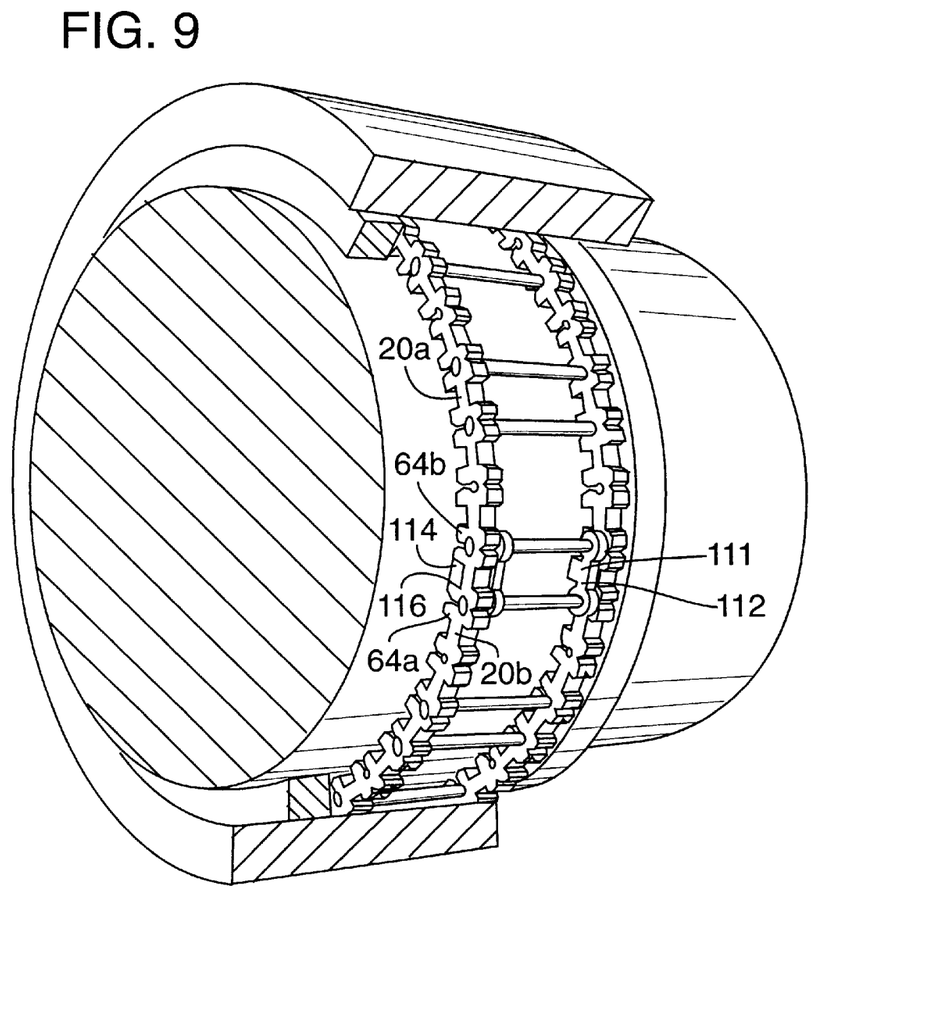
FIG. 9 is a perspective view of two seal cage sections joined by a master like as shown in FIG. 8.

FIG. 8 shows an alternative master link 110 wherein linking elements 112 are similar to linking elements 100 except for a boxlike link portion 114. When the seal cage is assembled with such a master link in place as shone in FIG. 9, the boxlike link portion 114 extends into the space 116 between brace receptacles 64a, 64b of seal cage portions 20a, 20b. This alternative master link design prevents kinking and assists in maintaining a uniform curviture of the rails around a shaft.

Figure 10:
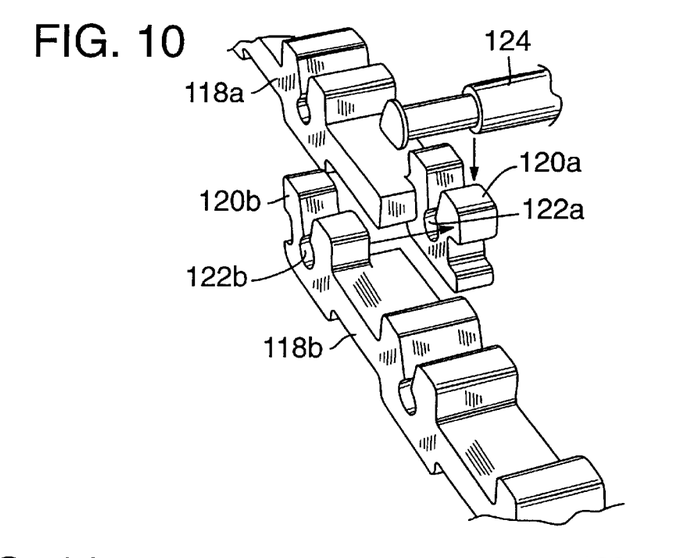
FIG. 10 is a perspective view of a length of a seal cage including an alternative "split rail" linking arrangement.

A "split rail" linking arrangement for linking rails (and thus for linking seal cage portions) is shown in FIG. 10. In this design, rail portions 118a, 118b have complementary interlocking rail end portions 120a and 120b, respectively, with matched central openings 122a and 122b, respectively. Thus, insertion of a pin 124 into the central openings 122a, 122b holds the rail end portions 120a, 120b together. When assembled from rail portions 118a and 118b, the resulting rail has substantially uniform flexibility throughout. Shorter, less expensive molds can be used, since rails and seal cage portions can be linked together using such linking arrangements without a loss of function.

A seal cage according to the invention can be conveniently provided in a kit form for use with SAE and/or metric packing seal ring sizes. In one embodiment such a seal cage kit includes: one or more long rails (from each of which one or more shorter rails can be cut to size), each rail having brace receptacles of a height corresponding to a preferred packing seal ring size; a plurality of pins; and one or more master links, which can be conveniently provided in a container with instructions for use, for example. Several rails for use with packing seal rings of different sizes also can be provided in a single kit for the sake of convenience. Simpler kits may provide only pins or rails, for example.

Sets of pins of different lengths can also be included in a kit. Different numbers of packing seal rings are used with various stuffing box designs; different pin lengths allow the user to fit the seal cage to any stuffing box depth. Different pin lengths also permit a user to vary the number of packing seal rings for a standard stuffing box design. For new installation it is generally preferable to use fewer packing seal rings, more injectable sealing compound, and thus longer pins. For standard installation, i.e., where standard packing material has been used previously, a wear groove may be present in the shaft (or in a sleeve associated with the shaft) under the bottom-most packing seal ring. An additional bottom packing seal ring can be used to prevent extrusion of injectable sealing compound past the bottom packing seal rings, in which case shorter pins and less injectable sealing compound are employed.

The following are examples of pin lengths (SAE) for new or standard installation:

Installation

| Size of Packing Seal Rings | New | Standard |
| --- | --- | --- |
| 3/8 inch | 1 1/8 inch | 3/4 inch |
| 1/2 inch | 1 3/4 inch | 1 1/4 inch |
| 5/8 inch | 2 1/2 inch | 1 7/8 inch |
| 3/4 inch | 2 3/4 inch | 2 inch |

In one form of use, before installation in the stuffing box, an assembled seal cage is pre-packed with an injectable sealing compound. To do so, the seal cage is laid flat, slot side up. Injectable sealing compound is then rolled between the rails so as not to extend above the rails. When the seal cage is installed, the rails act like a rake to hold the injectable sealing compound in place and prevent extrusion of the compound.

Assembly of an injectable sealing compound system including a seal cage according to an embodiment of the invention is as follows. Bottom packing seal ring(s) 24 is disposed around the shaft 26. Next, assembled seal cage 20 is bent into an annular configuration around the shaft 26 adjacent the bottom packing seal ring(s) 24 such that slot openings 76 are positioned as shown in FIG. 7. The bottom packing seal ring(s) 24 and seal cage 20 are pushed to the bottom of the stuffing box bore 28. Then, one or more top packing seal rings 22 are installed around the shaft 26 (i.e., as many top packing seal rings 22 as are necessary to fill the remaining space in the stuffing box bore 28). Packing follower 38 is installed and packing follower nuts 40 are tightened sufficiently on studs 42 to seal the packing seal rings 22, 24 to the stuffing box bore 28 and to the shaft 26, with seal cage 20 positioned between the top and bottom packing seal rings 22, 24, respectively. Injectable sealing compound is then injected into system 10 through fluid inlet port 48.

The apparatus has been described above for use as a seal cage for use with packing seal rings 22, 24 in seals and mechanical packing associated with a shaft, particularly in injectable sealing compound systems. It can also be used with braided compression packing systems, gasket rings, restriction bushings, taper rings, etc., in seals or mechanical packing employing either an injectable sealing compound or other cooling and lubricating substances, e.g., water, or both.

Figure 11:
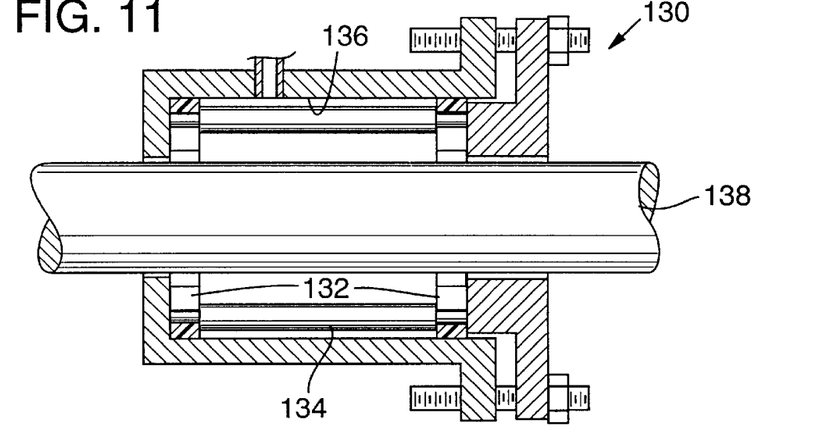
FIG. 11 is a simplified cross-sectional view of an injectable sealing compound system including a seal cage according to one embodiment with close tolerances to the stuffing box, such that packing rings are not required to prevent extrusion of an injectable compound.

Another embodiment of an injectable sealing compound system 130 is shown in FIG. 11. This embodiment is similar to that shown in FIG. 1, except that the seal cage, particularly rails 132, fit closer to the shaft. The rails 132 are positioned within a bore 136. The rails 132 substantially retain the injectable sealing compound between the rails without an additional sealing means exterior to the rails 132 (e.g., packing seal rings, braided compression packing systems, gasket rings, restriction bushings, taper rings, or other conventional sealing means) to prevent leakage of an injectable sealing compound past the rails 132, particularly if a more highly viscous injectable sealing compound is used (e.g., an injectable sealing compound that includes long fibers). Braces 134 extend between the rails 132 and, in the form shown, have portions which pass through and engage the rails.

Figure 12:
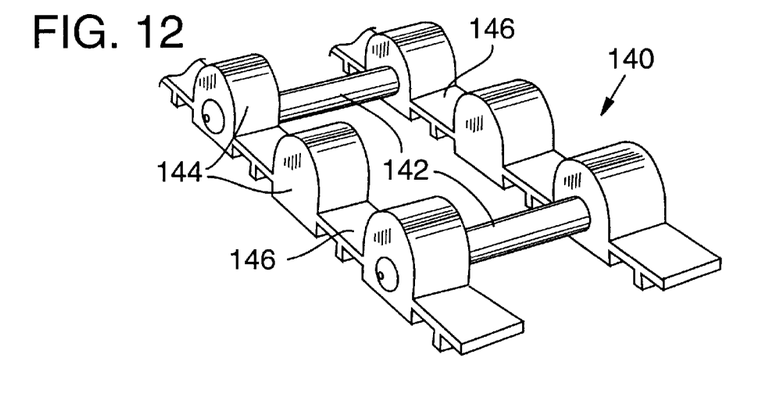
FIG. 12 is a perspective view of a one-piece injection molded seal cage.

As shown in FIG. 12, apparatus according to the invention, such as seal cage 140 can be injection molded. Because braces 142 cannot be removed from the brace towers 144, the distance between the rails is fixed. However, the rails 146 of such a one-piece or monolithic injection molded seal cage 140 could be cut to length to allow the length of the seal cage 140 to be adjusted for use with shafts of different diameters or could be provided in a closed, annular configuration for use with a specific shaft diameter. For injection molded apparatus according to the invention, brittle, inflexible materials should be avoided to prevent failure during use. Preferred materials for injection molded apparatus according to the present invention include various materials conventionally used for injection molding, including, but not limited, nylon, PDF, UHMW, VHMW, polysolfone, acetal, santoprene, PVDF, polypropylene, and polyethylene. The following materials are too brittle or inflexible for use in injection-molded seal cages according to the invention: polycarbonate, acrylic, styrene, FEP fluorocarbon, and ABS.

Apparatus according to the invention prevent packing rings or other sealing means from blocking an injection port should leakage of an injectable sealing compound occur. Additional sealing compound can be injected into the sealing system while the without shutting down the machinery and disassembling the seal. Moreover, apparatus according to the invention tend not to spin with the shaft, unlike previous stuffing box packing systems.

While apparatus according to the invention are useful as seal cages with injectable compounds as described above, they can also be used with cooling liquid in addition to or in place of an injectable compound, for example.

Having illustrated and described the principles of the invention in a preferred embodiment, it should be apparent to those skilled in the art that the invention can be modified in arrangement and detail without departing from such principles.

What is claimed is:

1. A seal cage for use in association with a shaft and a housing, the seal cage comprising:
   (a) a shaft;
   (b) first and second rails adapted to be disposed within the housing in a circular configuration around the shaft in laterally spaced positions to contain an injectable sealing compound in a space defined between the seal cage, the housing and the shaft, each rail comprising a plurality of brace towers spaced apart longitudinally along the rail and a plurality of connector elements connecting the brace towers, each of the brace towers including a first projecting portion that projects toward the shaft and a second projecting portion that projects away from the shaft when the first and second rails are disposed around the shaft;
   (c) a brace element attached to the brace towers and extending between the rails to maintain lateral spacing between the rails; and
   (d) a plurality of openings between the rails, the openings having a size sufficient to permit an injectable sealing compound to flow therethrough and into the space defined between the seal cage, the housing and the shaft.

2. The seal cage of claim 1 wherein the rails have an adjustable length.

3. The seal cage of claim 2 wherein the length of the rails is adjustable by cutting the rails.

4. The seal cage of claim 1 which is of a one-piece construction.

5. The seal cage of claim 4 which is injection molded.

6. The seal cage of claim 1 wherein the brace element is releasably attached to the brace towers.

7. The seal cage of claim 6 comprising a plurality of brace elements, each comprising first and second end portions, the first and second end portions having outer ends which are pointed, wherein the brace towers of the first rail each include a slot sized to receive the first end portion of a respective brace element, and wherein the brace towers of the second rail each include a slot sized to receive the second end portion of a respective associated brace element, and the slots opening in a direction toward the shaft when the rails surround the shaft.

8. The seal cage of claim 1 wherein the rails each further comprise a land positioned between adjacent brace towers and projecting away from the shaft when the rails surround the shaft.

9. The seal cage of claim 1 wherein the brace element comprises an elongate element having a head portion at an end thereof adapted to bear against a side of the first rail facing away from the second rail and project outwardly therefrom, and a shoulder spaced inwardly from the end of the brace element adapted to bear against a side of the first rail facing toward the second rail, thereby restricting lateral movement of the first rail relative to the second rail.

10. The seal cage of claim 1 wherein a plurality of brace towers on the first rail are laterally aligned with a corresponding plurality of brace towers on the second rail and a plurality of brace elements extend between the aligned brace towers with each brace element extending from a respective brace tower of the first rail to a corresponding brace tower of the second rail.

11. The seal cage of claim 1 wherein the openings comprise at least about 50 percent of an area defined between the rails.

12. The seal cage of claim 1 wherein the first and second projecting portions of the brace towers have respective ends and the connector elements are connected to the brace towers at a location nearer to the ends of the second projecting portion of the brace towers than to the ends of the first projecting portions.

13. The seal cage of claim 1 wherein:
   the brace element comprises an end portion; and
   at least one of the rails comprises first and second rail sections that have respective complementary rail end portions, wherein the rail end portions of the rails, when aligned, together define a brace receptacle that releasably holds the end portion of the brace element, thereby connecting the rail sections.

14. The seal cage of claim 1 wherein the injectable sealing compound is retained in the space between the seal cage and the shaft without a sealing means exterior to the rails.

15. A seal cage associated with a shaft comprising:
   (a) a housing within which at least a portion of the shaft is positioned;
   (b) first and second rails adapted to be disposed in an annular configuration around the shaft within the housing in laterally spaced positions to contain an injectable sealing compound in a space defined between the seal cage and the shaft;

(c) a plurality of brace elements extending between the rails so as to maintain lateral spacing between the rails; and (d) a plurality of openings between the rails sized sufficiently to permit an injectable sealing compound to flow therethrough and into the space between the seal cage and the shaft.

16. A seal cage of claim 15 in which the openings together occupy from about 50 percent to about 95 percent of an area defined between the first and second rails.

17. A seal cage of claim 16 wherein the openings are at least about 75 percent of the area defined between the rails.

18. A seal cage of claim 15 wherein the housing includes a port through which injectable sealing compound is injectable through the openings and into the space between the seal cage and the shaft.

19. A seal cage associated with a shaft comprising:
(a) a housing within which at least a portion of the shaft is positioned;
(b) first and second rails adapted to be disposed in an annular configuration around a shaft within the housing and in laterally spaced positions, each rail comprising a plurality of brace towers spaced apart longitudinally along the rail and a plurality of flexible connector elements connecting the brace towers, wherein the length of the rails is adjustable for use with shafts of different diameters; and
(c) a plurality of substantially rigid brace elements releasably attached to the brace towers and extending between the rails so as to maintain lateral spacing between the rails.

20. A seal associated with a shaft comprising:
a housing surrounding at least a portion of the shaft;
an injectable sealing compound; and
a seal cage comprising (i) first and second rails adapted to be disposed in an annular configuration around the shaft in laterally spaced positions and contain the injectable sealing compound therebetween, each rail comprising a plurality of brace towers spaced apart longitudinally of the rail and a plurality of flexible connector elements connecting the brace towers; (ii) a plurality of brace elements each extending from a respective brace tower of one rail to a respective brace tower of the second rail and maintaining a selected spacing between the rails; and (iii) a plurality of openings between the rails that permit substantially free flow of the injectable sealing compound therethrough.

21. A seal associated with a shaft comprising:
a housing surrounding at least a portion of the shaft; and
a seal cage disposed within the housing around the shaft, the seal cage comprising (a) first and second rails adapted to be disposed in an annular configuration around a shaft in laterally spaced positions, each rail comprising a plurality of brace towers spaced apart longitudinally along the rail and a plurality of connector elements connecting the brace towers; and (b) a plurality of brace elements releasably attached to the brace towers and extending between the rails so as to maintain lateral spacing between the rails.

22. A method of sealing a shaft comprising:
providing a seal cage comprising (a) first and second rails adapted to be disposed in an annular configuration around a shaft in laterally spaced positions to contain an injectable sealing compound in a space defined between the seal cage and the shaft, each rail comprising a plurality of brace towers spaced apart longitudinally along the rail and a plurality of connector elements connecting the brace towers, each of the brace towers including a first projecting portion that projects toward the shaft and a second projecting portion that projects away from the shaft when the first and second rails are disposed around the shaft; (b) a brace element attached to the brace towers and extending between the rails so as to maintain lateral spacing between the rails; and (c) a plurality of openings between the rails to permit an injectable sealing compound to flow therethrough and into the space between the seal cage and the shaft;

disposing the seal cage within a housing and in an annular configuration around the shaft; and introducing an injectable sealing compound within the housing through the openings between the rails.

23. A method of sealing a shaft within a housing comprising the steps of:

providing an elongated seal cage having a length and a width and comprising a plurality of openings of a sufficient size for the flow of an injectable sealing compound through the openings;

adjusting the length of the seal cage to a selected length such that the seal cage is disposable in an annular configuration around the shaft within the housing;

disposing the seal cage in an annular configuration around the shaft within the housing; and injecting an injectable sealing compound into the housing such that the injectable sealing compound flows through the openings in the seal cage.

24. The method of claim 23 wherein the seal cage comprises first and second spaced apart elongated rails and a plurality of cross braces extending between the rails to maintain lateral spacing between the rails.

25. The method of claim 24 wherein the step of adjusting the length of the seal cage comprises the step of interconnecting rail segments to produce a rail.

26. The method of claim 24 wherein the step of adjusting the length of the seal cage comprises cutting the first and second rails to length.

27. The method of claim 24 further comprising the step of mounting cross braces to the first and second rails, thereby producing the seal cage.

28. The method of claim 27 wherein the step of mounting the cross braces comprises snap fitting a first end of each cross brace into a brace receptacle of the first rail and snap fitting a second end of each cross brace into a corresponding brace receptacle of the second rail.

29. The method of claim 24 wherein the step of disposing the seal cage within the housing comprises disposing the seal cage without the housing without the use of a sealing means exterior to the rails.

30. The method of claim 23 wherein the seal cage has opposed ends when the seal cage is in a linear configuration, the method further comprising the step of linking the ends of the seal cage together such that the seal cage assumes an annular configuration.

31. The method of claim 23 wherein the step of adjusting the length of the seal cage comprises cutting a monolithic seal cage to the selected length.

* * * * *